United States Patent [19]

Lee

[11] Patent Number: 4,500,752
[45] Date of Patent: Feb. 19, 1985

[54] TELECONTROL SYSTEM FOR AN AUDIO RECORDER OF A RADIO TELEPHONE

[75] Inventor: Kyung-Suk Lee, Seoul, Rep. of Korea

[73] Assignee: Daewoo Electronic Co., Seoul, Rep. of Korea

[21] Appl. No.: 426,730

[22] Filed: Sep. 29, 1982

[30] Foreign Application Priority Data

Jun. 8, 1982 [KR] Rep. of Korea .................... 2550[U]

[51] Int. Cl.³ ............................................ H04M 11/10
[52] U.S. Cl. ................................ 179/2 EA; 179/2 A; 179/6.11
[58] Field of Search ................. 179/2 E, 2 EA, 2 EB, 179/2 EC, 2 A, 2 AM, 6.01, 6.03, 6.07, 6.11, 6.13, 6.16; 340/825.69, 825.72, 825.25; 455/35–38

[56] References Cited

U.S. PATENT DOCUMENTS

| | | | |
|---|---|---|---|
| 3,133,992 | 5/1964 | Dickman | 179/2 EA X |
| 3,757,049 | 9/1973 | Bonsky et al. | 179/6.11 |
| 4,004,276 | 1/1977 | Robinson et al. | 179/6.07 X |
| 4,122,305 | 10/1978 | Fish et al. | 179/2 A X |
| 4,219,698 | 8/1980 | Birilli et al. | 179/2 E X |
| 4,400,586 | 8/1983 | Hanscom | 179/6.11 |

Primary Examiner—Stafford D. Schreyer
Assistant Examiner—W. J. Brady
Attorney, Agent, or Firm—Fleit, Jacobson, Cohn & Price

[57] ABSTRACT

In a cordless telephone, normal tape recorder or micro cassette tape recorder is operated by memberance touch and is coupled to the main body of the telephone. The tape recorder operates on a cordless remote-control unit at remote distances from basic unit by means of control switch (record, play basic, rewind, fast forward, stop) attached to the remote unit. This arrangement provides a remote control record/play back cordless telephone to record and play back the speech content in the remote unit while the opposite party is on the telephone or before the speaking begins. The remote unit includes a digital encode circuit that converts the signal of a selected function for control switch into a digital signal corresponding to the selected function, FM-modulates and amplifies said digital signal, and then cordlessly transmits it to base unit. On the other hand, base unit includes a complementary digital decode circuit and transceiver.

4 Claims, 4 Drawing Figures

TELECONTROL SYSTEM FOR AN AUDIO RECORDER OF A RADIO TELEPHONE

Figure 1A:
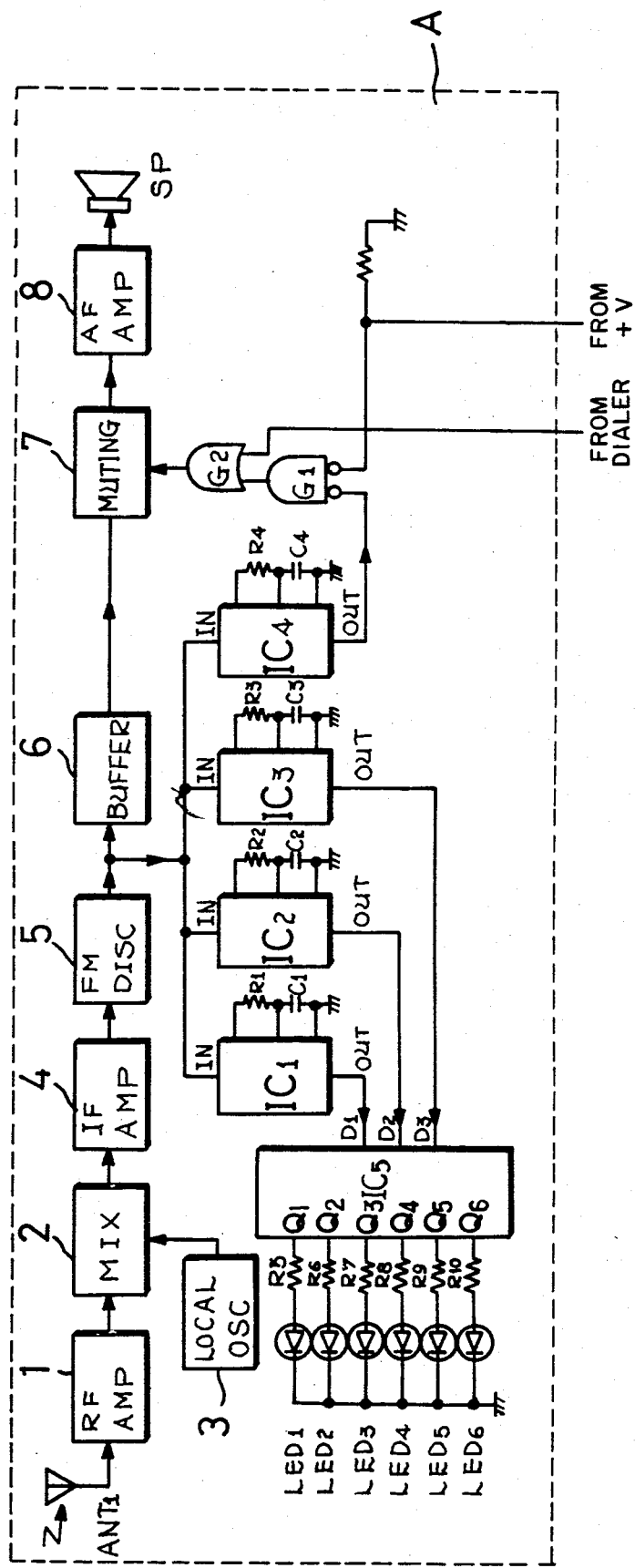
FIG. 1 is a circuit diagram of a telecontrol unit in a transmitter-receiver of a radiotelephone according to present invention.

Reference characters in the drawings indicate parts or units as follow. $IC_1$, $IC_2$, $IC_3$, $IC_4$, $IC_8$, $IC_9$, $IC_{10}$, $IC_{11}$ indicate tone decoders; $IC_5$ and $IC_{12}$ decoders; $IC_6$ an encoder; 9, 10, 11, 27, 28, 29 tone oscillators; $S_3$, $S_4$, $S_5$, $S_6$, $S_7$, $S_8$ control switches for the recorder; $LED_1$, $LED_2$, $LED_3$, $LED_4$, $LED_5$, $LED_6$ light emitting diodes:

DETAILED DESCRIPTION OF THE INVENTION

Present invention is related to a telecontrol system by means of which a recorder attached to a main body of a radiotelephone is remote controlled from a transmitter-receiver.

In prior arts, there have been some systems in that a recorder is attached to a telephone to record some of conversation in telephone communications. However, in a radiotelephone of which receiver is separated far from the main body of the telephone, the system has a drawback of inconvenience that a user has to come up to the main body to operate the recorder whenever a need for recording arises.

Present invention is directed to eliminate such a drawback in the conventional systems and to provide a system in that the recorder is remote controlled from the transmitter-receiver by telecontrol units provided on both the main body and transmitter-receiver of a radiotelephone.

Referring to the attached drawings, the present invention is described in detail as follows.

Figure 1B:
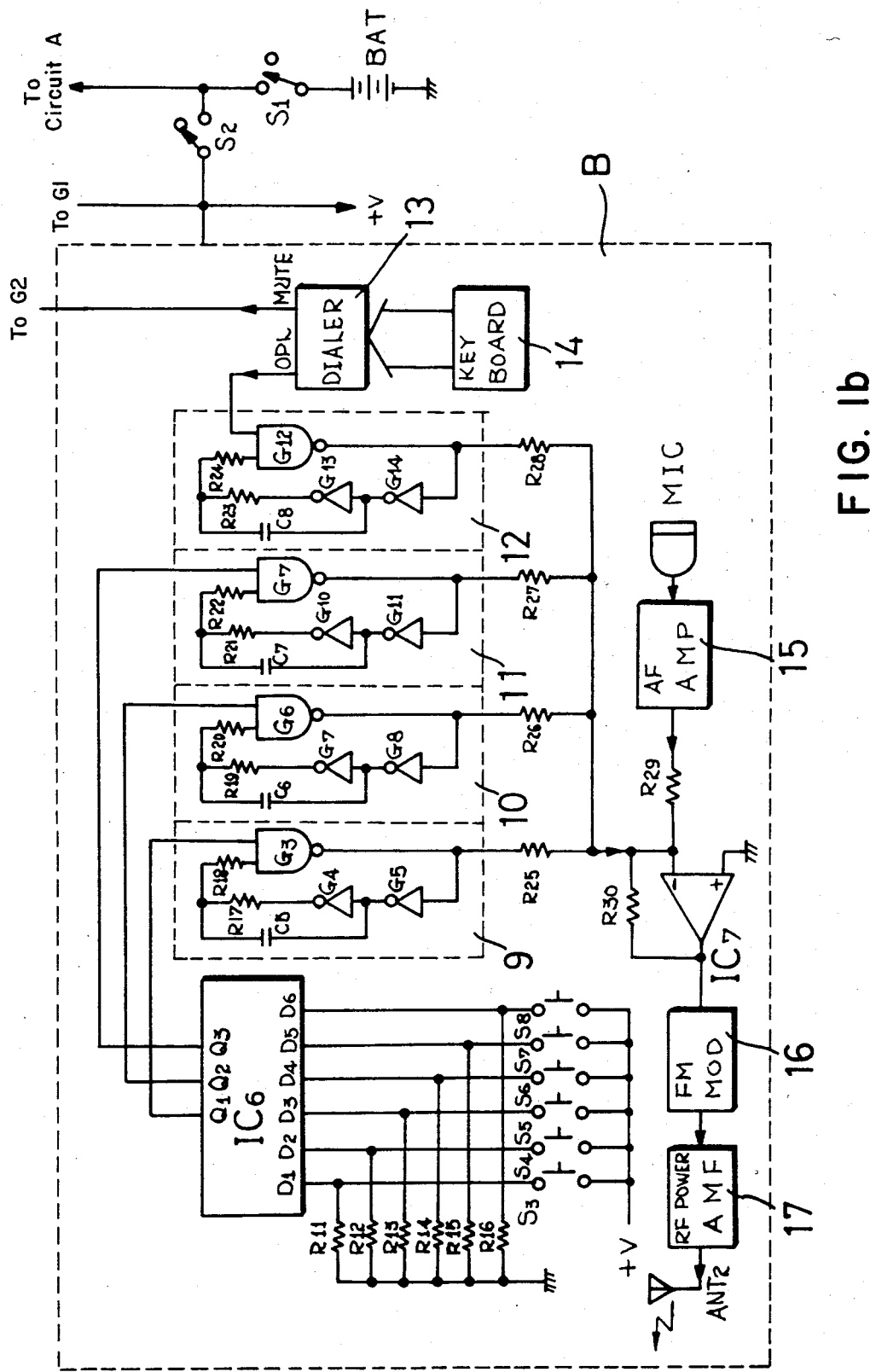

On the part of the transmitter-receiver, the system is so arranged as in the FIG. 1 that output of an FM detector is connected in parallel to input terminals (IN) of tone decoders ($IC_1$, $IC_2$, $IC_3$, $IC_4$), output terminals (OUT) of the tone decoders ($IC_1$, $IC_2$, $IC_3$) being connected through a decoder ($IC_5$) to light emitting diodes ($LED_1$, $LED_2$, $LED_3$, $LED_4$, $LED_5$, $LED_6$), the output terminal (OUT) of the tone decoder ($IC_4$) and a stand-by switch ($S_2$) respectively connected to inputs of a NOR gate ($G_1$), output of the gate and an output terminal (MUTE) of a dialer (13) respectively to inputs of an OR gate ($G_2$) for further connection to a muting circuit (7), recorder control switches ($S_3$, $S_4$, $S_5$, $S_6$, $S_7$, $S_8$) through an encoder ($IC_6$) to inputs of tone oscillators (9, 10, 11), input of a tone oscillator (12) to output (OPL) of the dialer (13), and outputs of the tone oscillators (9, 10, 11, 12) together with output of a voice amplifier (15) to input of an adding unit ($IC_7$).

Figure 2A:
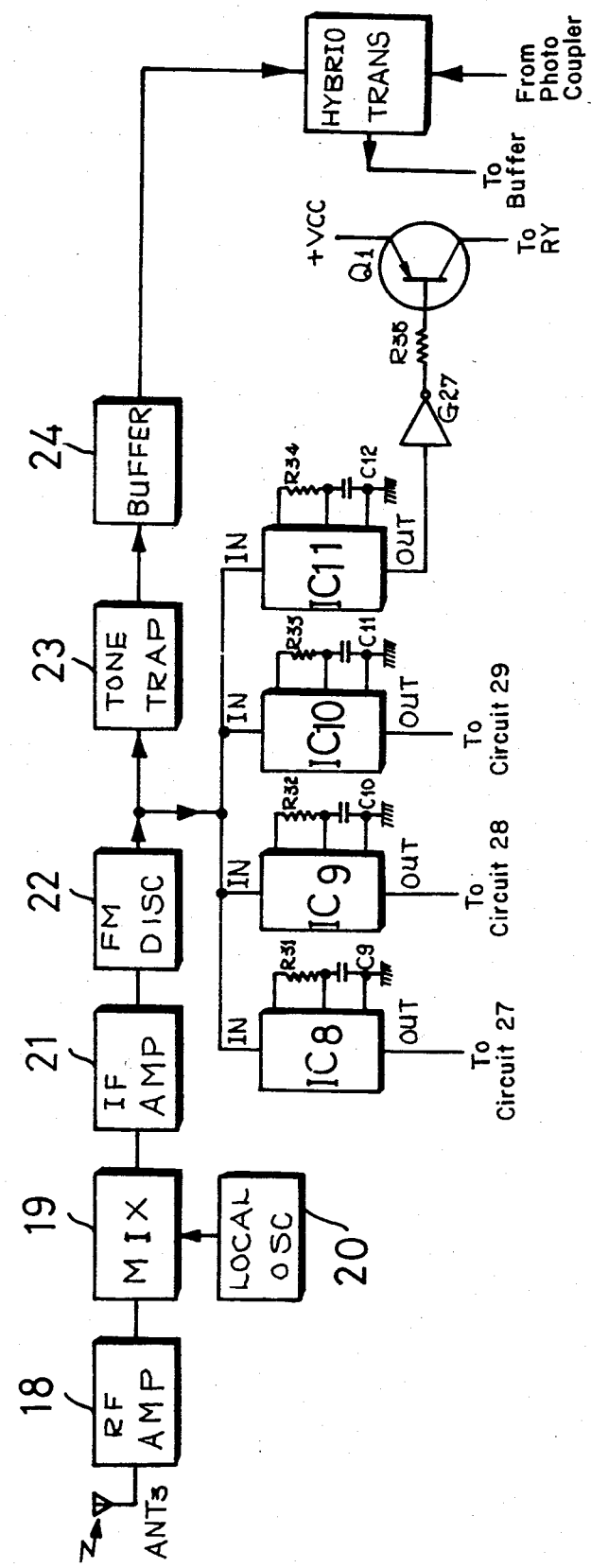
FIG. 2 is a circuit diagram of a telecontrol unit in the main body of the radiotelephone according to the invention.
Figure 2B:
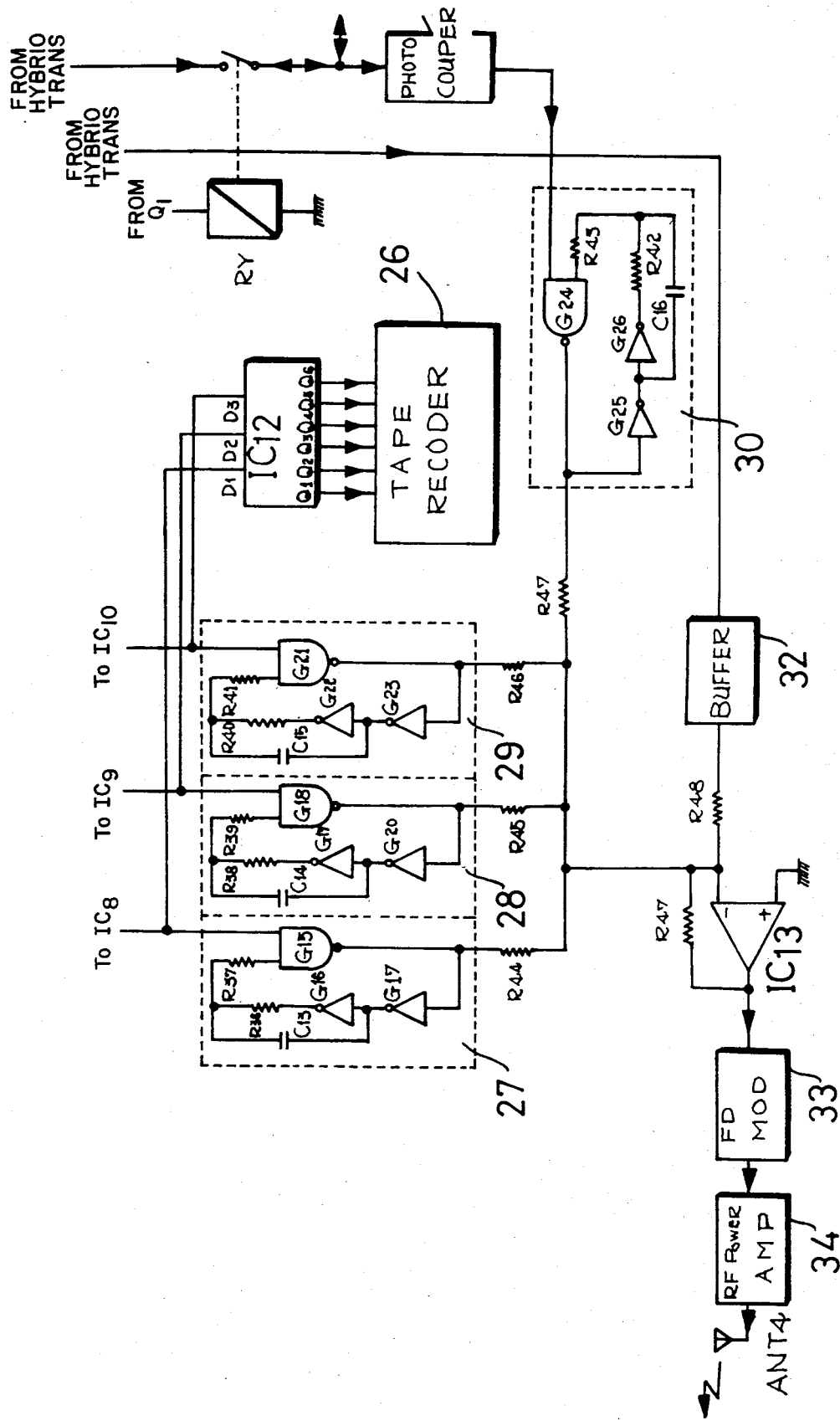

On the part of the main body as in the FIG. 2, output of an FM detector (22) is connected in parallel to input terminals (IN) of tone decoders ($IC_8$, $IC_9$, $IC_{10}$, $IC_{11}$), output terminals (OUT) of the decoders ($IC_8$, $IC_9$, $IC_{10}$) connected through a decoder ($IC_{12}$) to a common electronic audio recorder (26) and also directly to inputs of tone oscillators (27, 28, 29), and outputs of the oscillators (27, 28, 29), together with output of a tone oscillator (30) connected to a photo coupler (31) and with output of a buffer amplifier (32), to input of an adding unit ($IC_{13}$).

The system is such that oscillation frequencies of the tone oscillators (9, 10, 11, 12 and 27, 28, 29, 30) on both parts stated above are different from each other but are arranged to correspond to locked frequencies of their responsive tone decoders ($IC_8$, $IC_9$, $IC_{10}$, $IC_{11}$ and $IC_1$, $IC_2$, $IC_3$, $IC_4$).

Unexplained characters in the drawings indicate the following units; That is, 1 and 18 indicate high frequency amplifiers; 2 and 19 mixers; 3 and 20 local oscillators; 4 and 21 intermediate amplifiers; 6 and 24 buffer amplifiers; 8 a voice amplifier; 14 a key board; 16 an 33 FM modulators; 17 and 34 high frequency power amplifiers; 23 a tone trap; 25 hybrid transformer; $G_3$, $G_6$, $G_9$, $G_{12}$, $G_{15}$, $G_{18}$, $G_{21}$, $G_{24}$ NAND gates; $G_4$, $G_5$, $G_7$, $G_8$, $G_{10}$, $G_{11}$, $G_{13}$, $G_{14}$, $G_{16}$, $G_{17}$, $G_{19}$, $G_{20}$, $G_{22}$, $G_{23}$, $G_{25}$, $G_{26}$, $G_{27}$ inverters; $S_1$ a source switch; $R_1$ thru $R_{49}$ resistances; $C_1$ thru $C_{16}$ capacitors; $ANT_1$ thru $ANT_4$ antennas; Ry a relay; Q1 a transistor; TEL LINE telephone circuit line; SP a speaker; MIC a microphone; A a receiver part; B a transmitter part.

The manner of operation of the invention will be explained in detail with reference to the drawings.

The transmitter part (B) of the transmitter-receiver is connected to a source for power supply only while the stand-by switch ($S_3$) is on ON-position and then activates for operation. On pushing one of the recorder control switches ($S_3$, $S_4$, $S_5$, $S_6$, $S_7$, $S_8$) one of input terminals ($D_1$ thru $D_6$) of the encoder ($IC_6$) obtains a high level and output terminals ($Q_1$, $Q_2$, $Q_3$) give out a responsive signal of binary digit. For example, on pushing the switch (5) the encoder outputs a signal of a binary digit "101" responsive to a decimal digit "5".

Succeedingly, a tone oscillator (9, 10 or 11) connected to the output terminal ($Q_1$, $Q_2$ or $Q_3$) in high level (H) of the encoder ($IC_6$) is activated to oscillate, but the oscillator connected to the output terminal in low level (L) is not activated for oscillation, so that binary digital data in a multi-frequency system be produced for addition at the adding unit ($IC_7$) and then modulated by an FM modulator (16) for transmission.

The signal, being received at the main body of the radio telephone, is carried through an FM detector (22) for detection. Since locked frequencies of the tone decoders ($IC_8$, $IC_9$ and $IC_{10}$) connected to the output of the detector (22) correspond respectively to the responsive oscillation frequencies of the tone oscillators (9, 10 and 11) on the part of the transmitter-receiver, only the output of a tone decoder ($IC_8$, $IC_9$ or $IC_{10}$) responsive to the tone oscillator in operation gains high level (H), while the others remain in low level (L). Consequently, a signal of binary digit corresponding to the output of the encoder ($IC_6$) enters the input terminal ($D_1$, $D_2$, $D_3$) of the decoder ($IC_{12}$) for a responsive output terminal ($Q_5$ in the above stated example) of the decoder ($IC_{12}$) to gain high level (H) so that the recorder (26) be activated for operation synchronously with the pushing of control switch at the transmitter-receiver.

Outputs of the tone decoders ($IC_8$, $IC_9$ an $IC_{10}$) are also connected to the tone oscillators (27, 28 and 29) so that only the tone oscillator being connected to the output in high level of the decoder may produce oscillation. Consequently, the signal is produced as data of binary digit in a multifrequency system to be added at the adding unit ($IC_{13}$) and then to be modulated through the FM modulator (33) for transmission, which is received at the transmitter-receiver and carried through the detector (22) to enter the tone decoders ($IC_1$, $IC_2$ and $IC_3$). Succeedingly, the output of the tone decoder ($IC_1$, $IC_2$ or $IC_3$) is given out in a binary digit corresponding to the output of the tone decoder ($IC_8$, $IC_9$ or $IC_{10}$) and then converted into a decimal digit through the decoder ($IC_5$) to light up a responsive light emitting diode ($LED_1$, $LED_2$, $LED_3$, $LED_4$, $LED_5$, $LED_6$), thereby enabling to confirm the reliable transmission of control signal from the transmitter-receiver to the body of telephone.

On calling from the transmitter-receiver, the tone oscillator (12) and the tone decoder ($IC_{11}$) are activated by the output (OPL) of the dialer (13) to put the relay (Ry) on ON-position so that a hybrid transformer (23) and the telephone line make an intermittent connection between them.

On a telephone call from the outside while the stand-by switch ($S_2$) is OFF to cut off the source for the transmitter part (B), the photo coupler (31) of the main body picks up the signal to activate the tone oscillator (30) for transmission, which is received by the receiver to make the output of the decoder ($IC_4$) gain high level (H) so that the muting circuit (7) in a cut-off state of stand-by is put on through. The signal of the tone oscillator (30) carried through the FM detector (5) is given out through the voice amplifier (8) to the speaker (SP) to inform the call to a user.

As stated above, the present invention provides a telecontrol system for a recorder attached to a radio-telephone, in particular, by means of which the recording of telephone conversation between users may be controlled at the receiver far apart from the main body, and in which the transmission of control signal to the recorder may also be confirmed for its reliability at the transmitter.

What is claimed is:

1. A base remote control system for remotely controlling a tape recorder coupled to the main base unit of a cordless telephone, said recorder being actuated by a recorder control signal, said main base unit including means for receiving and demodulating a transmitted signal from a handset of said cordless telephone, and means for transmitting to said handset a received telecommunications signal from a telephone line upon actuation of a switching means, said main base unit including a transformer coupling means to couple the received demodulated signal with said means for transmitting, the remote control system comprising:
   a base tone decoding means coupled to the output of said means for receiving and demodulating, said base tone decoding means having a group of outputs at which are applied a received and tone decoded control signal for said recorder from said handset;
   a plurality of base tone oscillators, one base tone oscillator coupled to a respective output of said group of outputs of said base tone decoding means to generate a respective frequency control signal corresponding to the input tone decoded control signal, the outputs of said base tone oscillators coupled together to generate a multi-frequency control signal;
   means for combining the multi-frequency control signal with any additional signal to be transmitted by said main base unit to said handset; and
   a decoder interface device coupling a respective output of said group of outputs of said base tone decoding means with the corresponding input of said recorder to actuate said recorder by said recorder control signal corresponding to the tone decoded control signal.

2. A base remote control system as in claim 1 wherein said means for receiving and demodulating said transmitted signal from said handset including an FM detector and a tone trap; said base tone decoding means including first, second, third and fourth tone decoders having their input terminals connected between said FM detector and said tone trap to produce said tone decoded control signal, said first, second and third tone decoders having their output terminals connected to a first, second and third data terminal of said decoder interface device, respectively; said decoder interface device having its output terminals connected to respective inputs of said recorder to actuate said recorder; said first, second and third tone decoders having said output terminals connected, respectively, to said plurality of base tone oscillators including first, second and third NAND gates, respectively; and a first adder circuit being part of said means for combining and connected to each output terminal of said first, second and third NAND gates to combine said multi-frequency signal with said additional signal.

3. A handset remote control system for remotely controlling a tape recorder coupled to the main base unit of a cordless telephone, said recorder being actuated by a recorder control signal, said cordless telephone including a handset capable of receiving and transmitting radio frequency signals over a distance from said main base unit, said handset including means for demodulating a base unit transmitted signal and means for transmitting a signal to said base unit, the remote control system comprising:
   a handset tone decoding means coupled to the output of said demodulating means, said handset tone decoding means receiving and tone decoding a control signal for said recorder from said base unit and applying the received and tone decoded control signal at a plurality of outputs;
   a handset decoder means generating a further decoded control signal corresponding to said received and tone decoded control signal, said handset decoder means having outputs coupled to a plurality of indicator means to display the further decoded control signal;
   a plurality of switches for generating an initial control signal representative of the desired recorder control;
   an encoder coupled to said plurality of switches to digitally encode initial control signal and apply said digitally encoded control signal on a plurality of outputs;
   a plurality of handset tone oscillators, one handset tone oscillator of said plurality actuated by a respective output of said encoder, said plurality of handset tone oscillators generating a multi-frequency control signal representative of said digitally encoded control signal; and
   combining means for combining said multi-frequency control signal with any additional signal to be transmitted by said handset to said base unit.

4. A handset remote control system as in claim 3 wherein said means for demodulating including an FM detector and a buffer amplifier affecting said base unit transmitted signal; said handset tone decoding means including a first, second, third and fourth tone decoder having their input terminals connected between said FM detector and said buffer amplifier for generating said tone decoded control signal, said first, second and third tone decoders having their output terminals connected to a first, second and third data terminal of said handset decoder means, respectively, for generating said further decoded control signal; said handset decoder means having output terminals connected to said plurality of indicator means which includes respective light-emitting diodes coupled to said handset decoder means output terminals; said encoder including output terminals respectively connected to said handset tone oscillators via first, second and third NAND gates in each respective handset tone oscillator to generate a respective frequency for said multi-frequency signal; and, said combining means including a first adder circuit connected to each output terminal of said first, second and third NAND gates.

* * * * *